United States Patent [19]

Haruta et al.

[11] Patent Number: 4,585,484
[45] Date of Patent: Apr. 29, 1986

[54] RECORDING LIQUID

[75] Inventors: Masahiro Haruta, Funabashi; Tadayuki Nakousai, Atsugi; Kazuo Iwata, Urawa; Keiko Nakousai, Atsugi, all of Japan

[73] Assignee: Canon Kabushiki Kaisha, Tokyo, Japan

[21] Appl. No.: 591,556

[22] Filed: Mar. 20, 1984

[30] Foreign Application Priority Data

| Mar. 24, 1983 | [JP] | Japan | 58-49436 |
| Mar. 24, 1983 | [JP] | Japan | 58-49437 |
| Mar. 24, 1983 | [JP] | Japan | 58-49438 |

[51] Int. Cl.⁴ ............................................. C09D 11/00
[52] U.S. Cl. ..................................................... 106/22
[58] Field of Search .......................................... 106/22

[56] References Cited

U.S. PATENT DOCUMENTS

| 3,846,141 | 11/1974 | Ostergren et al. | 106/22 |
| 4,098,948 | 7/1978 | Skelly et al. | 428/411 |
| 4,197,135 | 4/1980 | Bailey et al. | 106/23 |
| 4,409,040 | 10/1983 | Tabayashi et al. | 106/20 |

Primary Examiner—Amelia B. Yarbrough
Attorney, Agent, or Firm—Fitzpatrick, Cella, Harper & Scinto

[57] ABSTRACT

A recording liquid comprises a dye selected from C.I. Direct Blue 199, C.I. Direct Yellow 86 and C.I. Food Black 2 as the recording agent for forming an image and a liquid medium for dissolving or dispersing said recording agent therein, said liquid medium comprising at least: (a) either one or both of polyethylene glycol and polyethylene glycol monomethyl ether, (b) either one or both of diethylene glycol and sulfolane, (c) either one or both of N-methyl-2-pyrrolidone and 1,3-dimethyl-2-imidazolidinone and (d) water.

25 Claims, 5 Drawing Figures

RECORDING LIQUID

BACKGROUND OF THE INVENTION

1. Field of the Invention

This invention relates to a novel recording liquid, particularly to a recording liquid suitable for a recording system in which recording is performed by permitting a recording liquid to be discharged through a fine discharging outlet (discharging orifice) provided at a recording head and fly as droplets.

2. Description of the Prior Art

For the writing tools (fountain pens, felt pens, etc.) to perform recording on a recording sheet such as paper of the prior art, various types of ink has been used wherein dyes are dissolved in water or other organic solvent.

On the other hand, in the so-called ink jet recording system wherein the liquid contained in a recording head is discharged by vibration by means of a piezo-vibrating element or electrostatic attracting force by application of a high voltage thereby to effect recording, compositions having various dyes dissolved in water or organic solvents have been known to be used. However, as compared with ink for stationery such as fountain pens or felt pens in general, the recording liquid for ink jet recording is used in more severe conditions in a large number of characteristics.

Such an ink jet recording method performs recording by permitting droplets of a recording liquid called as ink to fly and to be attached onto a recording sheet. Such a recording liquid is composed basically of a recording agent (dyes or pigments are used) and a liquid medium for dispersing said agent (water or various organic solvents or mixtures thereof are used), and may also contain various additives, if desired.

For such recording methods, there are various systems depending on the method of generating droplets and the method of controlling the flying direction of the droplets. FIG. 1 shows an example of such systems.

More specifically, the device shown in FIG. 1 gives recording signals to the recording head having a piezo-vibrating element and permits droplets of a recording liquid to be generated responding to said signals thereby to effect recording. In FIG. 1, 1 is a recording head and has a piezo-vibrating element 2a, a vibrating plate 2b, an inlet for recording liquid 3, a liquid chamber 4 within the head and a discharging outlet (discharging orifice) 5. Into the liquid chamber 4, a recording liquid 7 stored in a reservoir tank 6 is fed through a feed pipe 8. In the course of the feed pipe, an intermediate treating means 9 such as pump or filter may sometimes be provided. And on the piezo-vibrating element 2a, a signal transduced from the recording signal 8 to pulse by means of the signal processing means 10 (e.g. pulse transducer) is applied, and pressure change corresponding to said signal will occur on the recording liquid within the liquid chamber 4. As a result, the recording liquid 7 is discharged through the orifice 5 as the droplet 11 to effect recording on the surface of the recording sheet 12.

Other than the device as described above, various types of devices have been known. For example, as shown in FIG. 2, the liquid chamber 4 is made like a nozzle as a modification of FIG. 1, and a cylindrical piezo-vibrating element is arranged at the peripheral portion thereof (the mechanism of this device for generation of droplets is essentially the same as the device shown in FIG. 1). There is also a device in which electrically charged droplets are continuously generated, and a part of said droplets are used for recording. Alternatively, also known is a device in which heat energy responding to recording signal is given to the recording liquid within the chamber of the recording head to generate droplets by said energy.

One example of such a device is shown in FIG. 3A, FIG. 3B, FIG. 3C and FIG. 4.

The head 13 is obtained by bonding a glass, ceramic or plastic plate and the like having groove 14 for passing ink with a heat generating head 15 (in the drawings, thin film head is shown, but it is not limited thereto). The heat generating head 15 is composed of a protective film 16 formed of silicon oxide, etc., aluminum electrodes 17-1 and 17-2, a heat generating resistor layer 18 formed of nickel-chromium, etc., a heat accumulating layer 19 and a substrate 20 having good heat releasing property such as alumina, etc.

The ink 21 has come to the discharging orifice 22 and forms a meniscus 23 under a pressure P.

On application of an electrical signal on electrodes 17-1 and 17-2, the region shown by n of the heat generating head 15 will generate heat abruptly and bubbles of the ink 21 in contact with said region are generated, whereby the meniscus is protruded by the pressure of the bubbles discharging the ink 21 through the orifice 22 as small recording droplets, which then fly toward the recording sheet. FIG. 4 shows a perspective view of the appearance of a multi-head in which a number of the heads shown in FIG. 3A are juxtaposed. Said multi-head is made by bonding a glass plate 27 having a multi-groove 26 with the same heat generating head 28 as described with reference to FIG. 3A.

In the above drawings, FIG. 3A is a sectional view of the head 13 taken along the ink pathway, and FIG. 3B is a sectional view of FIG. 3A taken along the line A - B.

In the prior art, as the recording liquid of this kind, various solutions or dispersions having various dyes or pigments dispersed in aqueous or non-aqueous solvents have been known, as disclosed in, for example, Japanese Patent Publication Nos. 8361/1975, 40484/1976, 13126/1977 and 13127/1977, and Japanese Laid-open Patent Publication No. 95008/1975. Desired characteristics for the recording liquid of this kind are:

(1) to have liquid physical properties (viscosity, surface tension, electroconductivity, etc.) matched with the discharging conditions (voltage for driving piezoelectric elements, driving frequency, shape and material of orifice, orifice diameter, etc.);
(2) to be stable during storage over a long term without clogging of minute discharging orifice or capillary pores;
(3) to be rapidly fixed onto a recording sheet (paper, film, etc.) and smooth around the dot with little blurring;
(4) to be capable of giving a printed image which is clear in tone and high in density;
(5) to be capable of giving a printed image excellent in water resistance and light resistance.
(6) not to corrode surrounding materials (vessel, connecting tube, sealant, etc.); and
(7) to be excellent in safety being free from odor, toxicity, flammability, etc.

SUMMARY OF THE INVENTION

One object of the present invention is to provide a recording liquid having liquid physical properties (viscosity, surface tension, electroconductivity, etc.) matched with the discharging conditions (voltage for driving piezoelectric element, driving frequency, shape and material of orifice, orifice diameter, etc.).

Another object of the present invention is to provide a recording liquid, which is stable during storage over a long term and will cause no clogging of a minute discharging orifice or a capillary tube.

A further object of the present invention is to provide a recording liquid which can rapidly be fixed onto a recording sheet (paper, film, etc.) and is smooth around the dot with little blurring.

Still another object of the present invention is to provide a recording liquid capable of giving a printed image which is clear in tone and high in density.

Still further object of the present invention is to provide a recording liquid capable of giving a printed image excellent in water resistance and light resistance.

Still another object of the present invention is to provide a recording liquid which will not corrode surrounding materials (vessel, connecting tube, sealant, etc.).

A still further object of the present invention is to provide a recording liquid excellent in safety being free from odor, toxicity, flammability, etc.

According to one aspect of the present invention, there is provided a recording liquid, which comprises C.I. Direct Blue 199 as the recording agent which is a component for forming an image and a liquid medium for dissolving or dispersing said recording agent therein, said liquid medium comprising at least:
  (a) either one or both of polyethylene glycol and polyethylene glycol monomethyl ether,
  (b) either one or both of diethylene glycol and sulfolane;
  (c) either one or both of N-methyl-2-pyrrolidone and 1,3-dimethyl-2-imidazolidinone; and
  (d) water.

According to another aspect of the present invention, there is provided a recording liquid, which comprises C.I. Direct Yellow 86 as the recording agent which is a component for forming an image and a liquid medium for dissolving or dispersing said recording agent therein, said liquid medium comprising at least:
  (a) either one or both of polyethylene glycol and polyethylene glycol monomethyl ether,
  (b) either one or both of diethylene glycol and sulfolane;
  (c) either one or both of N-methyl-2-pyrrolidone and 1,3-dimethyl-2-imidazolidinone; and
  (d) water.

According to further aspect of the present invention, there is provided a recording liquid, which comprises C.I. Food Black 2 as the recording agent which is a component for forming an image and a liquid medium for dissolving or dispersing said recording agent therein, said liquid medium comprising at least:
  (a) either one or both of polyethylene glycol and polyethylene glycol monomethyl ether,
  (b) either one or both of diethylene glycol and sulfolane;
  (c) either one or both of N-methyl-2-pyrrolidone and 1,3-dimethyl-2-imidazolidinone; and
  (d) water.

DETAILED DESCRIPTION OF THE PREFERRED EMBODIMENT

Figure 1:
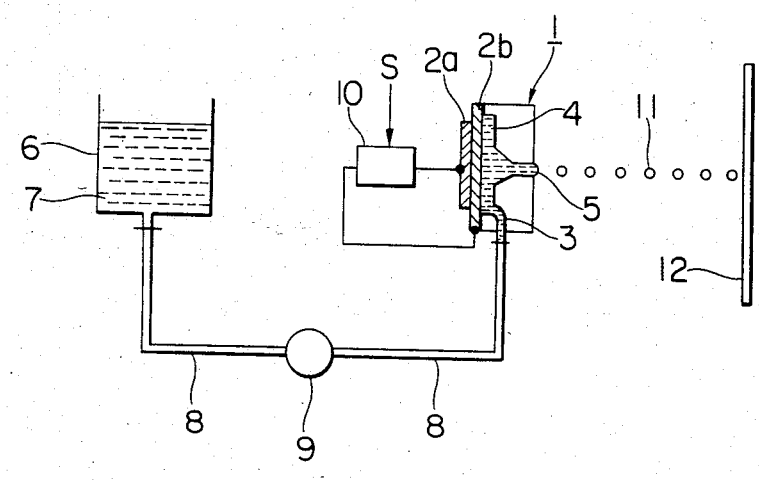
FIG. 1 and FIG. 2 are each schematic illustration of an ink jet recording device.
Figure 2:
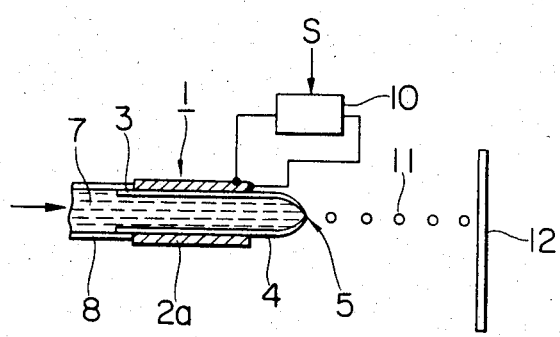
Figure 3A:
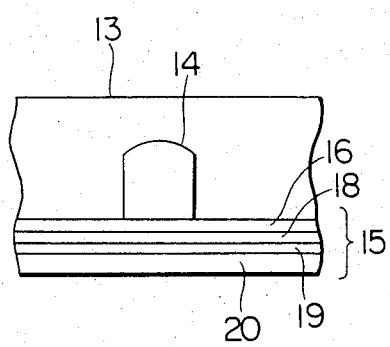
FIG. 3A and FIG. 3B are longitudinal and lateral cross-sectional views of the pertinent portion of another recording device.
Figure 3B:
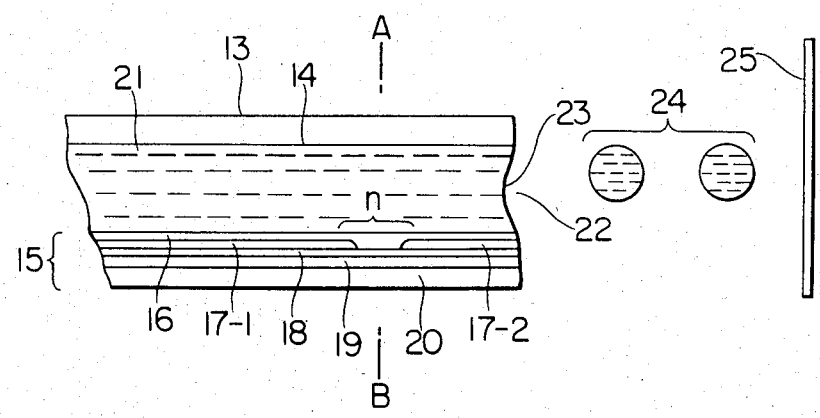
Figure 4:
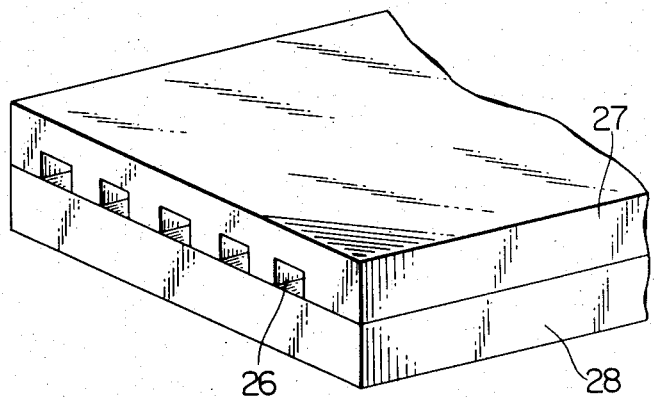
FIG. 4 is a perspective view of the appearance of a head having the heads as shown in FIG. 3A and FIG. 3B arranged in a multiple array.

The recording liquid of the present invention is composed basically of a dye and a solvent therefor, and accordingly the characteristics of the above recording liquid are determined by matching of the dye with its solvent. Therefore, it is a very important technique in this field of the art to contrive a matching between the dye and its solvent composition so that the recording liquid may be endowed with the above characteristics.

As the result of extensive studies, a suitable combination of a dye and a solvent for a recording to be used for such a purpose has been discovered to accomplish the present invention.

According to the present invention, there can be obtained a recording liquid, in which the viscosity is less dependent on the environmental temperature and in which viscosity and surface tension is less dependent on water content thereof, and therefore not only the constant discharging state can be maintained even when the temperature in the environment may greatly vary, but also no impairment of re-discharging characteristic after the liquid is left to stand caused by viscosity increase through evaporation of water from the nozzle tip or no discharging failure clogging will occur at all.

Further, there can be obtained a recording liquid which will result in neither changes in physical properties nor precipitation of solids during storage, can effect recording on various kinds of members, is great in fixing speed and also capable of giving images excellent in water resistance, light resistance abrasion resistance and resolution.

The content of the dye to be used in the present invention, namely C.I. Direct Blue 199, C.I. Direct Yellow 86 or C.I. Food Black 2, may be determined depending on the kind of the liquid medium and the characteristics required for the recording liquid. Generally, however, it may be within the range from 0.1 to 20%, preferably from 0.5 to 15%, more preferably from 1 to 10%, by weight based on the total weight of the recording liquid. Said dye may be used of course singly or as a combination with other dyes (namely any of said dyes as the essential component in combination with other various dyes such as direct dyes or acidic dyes).

The content of the liquid medium to be used in the present invention may be generally, expressed as weight percent based on the total weight of the recording liquid, 1 to 30% of either one or both of polyethylene glycol and polyethylene glycol monomethyl ether, 1 to 40% of either one or both of diethylene glycol and sulfolane, 1 to 40% of either one of N-methyl-2-pyrrolidone and 1,3-dimethyl-2-imidazolidinone and 10 to 90% of water, more preferably 5 to 20% of either one or both of polyethylene glycol and polyethylene glycol monomethyl ether, 5 to 30% of either one or both of diethylene glycol and sulfolane, 5 to 30% of either one of N-methyl-2-pyrrolidone and 1,3-dimethyl-2-imidazolidinone and 10 to 70% of water.

The recording liquid of the present invention prepared from such components is excellent in itself, being well balanced in various characteristics, including recording characteristics (signal response, stability of liquid droplet formation, discharging stability, continuous recording over a long time, discharging stability after intermission over a long term), storage stability, fixability onto a recording sheet or light resistance, weathering resistance, water resistance, etc. of the recorded images. And, for further improvement of such characteristics, it is also possible to incorporate various kinds of additives known in the art.

For example, there may be employed a viscosity controlling agent such as polyvinyl alcohol, celluloses, water-soluble resins; a surfactant such as of cationic, anionic or nonionic type; a surface tension controlling agent such as diethanolamine, triethanolamine, etc.; a pH controlling agent such as those with the use of buffers; antifungals; etc.

For preparation of a recording liquid to be used in the ink jet recording method of the type wherein the recording liquid is charged, there may be added a specific resistance controlling agent of inorganic salts such as lithium chloride, ammonium chloride, sodium chloride, etc.

When the recording liquid of the present invention is to be applied for an ink jet system of the type wherein the recording liquid is discharged by the action of heat energy, thermal properties of the liquid (e.g. specific heat, coefficient of thermal expansion, thermal conductivity, etc.) may sometimes be adusted.

The present invention is described in more detail by referring to the following Examples.

EXAMPLE 1

| | |
|---|---|
| C.I. Direct Blue 199 | 3 parts by weight |
| Polyethylene glycol monomethyl ether (average molecular weight: 210-240) | 15 parts by weight |
| Diethylene glycol | 15 parts by weight |
| N—methyl-2-pyrrolidone | 15 parts by weight |
| Water | 52 parts by weight |

The above composition was thoroughly mixed and dissolved in a vessel, filtered through a Teflon filter with a pore size of 1μ and then subjected to degassing treatment by means of a vacuum pump to provide a recording liquid. By using the recording liquid obtained, the following items $(T_1)$–$(T_2)$ were examined by means of a recording device having an on-demand type recording head which discharges a recording liquid by a piezo-vibrating element (Discharging orifice diameter 50μ; driving voltage for piezo-vibrating element 60 V; frequency 4 KHz). Good results were obtained in all the items.

$(T_1)$: Long term storability of recording liquid: The recording liquid was sealed in a glass vessel, and stored for 6 months at −30° C. and 60° C., whereafter no precipitation of insolubles was found and there was observed no change in physical properties and color tone of the liquid.

$(T_2)$: Discharging stability: Continuous discharging was conducted in an atmosphere of a room temperature, 5° C. and 40° C., respectively, for 24 hours. High quality recording could be performed stably from the beginning to the end under any of these conditions.

$(T_3)$: Discharging response: Intermittent discharging per every two seconds and discharging after standing for 2 months were examined. In either case, there was no clogging at the orifice tip, and recording was effected stably and uniformly.

$(T_4)$: Quality of recorded image: The image recorded was high in density and clear. The lowering in density after exposure to the light in a room for 3 months was 1% or less and blurring of the image when dipped in water for one minute was very small.

$(T_5)$: Fixability on various recording materials: On the recording sheets indicated in the Table below were printed letters, and after 15 seconds the printed portion was rubbed with a finger and presence of slippage or blurring was examined. In any of the cases, excellent fixing characteristic was exhibited without slippage or blurring.

| Name of recording sheet | Classification | Manufacturer |
|---|---|---|
| Ginkan | High quality paper | Sanyo Kokusaku Pulp Co., Ltd. |
| Seven Star | " | Hokuetsu Seishi Co., Ltd. |
| Hakubotan | Medium quality paper | Honshu Seishi Co., Ltd. |
| Toyoroshi No. 4 | Non-sized paper | Toyo Roshi Co., Ltd. |

Example 2

| | |
|---|---|
| Polyethylene glycol monomethyl ether (average molecular weight: 210-240) | 10 parts by weight |
| Sulfolane | 10 parts by weight |
| N—methyl-2-pyrrolidone | 20 parts by weight |
| C.I. Direct Blue 199 | 3 parts by weight |
| Water | 57 parts by weight |

Similarly as in Example 1, a recording liquid having the above composition was prepared and the items $(T_1)$–$(T_5)$ were examined similarly as in Example 1 by means of a recording device having a multi-head of on-demand type in which recording is effected by giving heat energy to the recording liquid in the recording head to generate liquid droplets (discharging orifice diameter 35μ; resistance value of heat generating resistor 150 ohm; driving voltage 30 V; frequency 2 KHz). As the result, excellent results were obtained in all the tests examined.

EXAMPLE 3

| | |
|---|---|
| C.I. Direct Blue 199 | 5 parts by weight |
| Polyethylene glycol (average molecular weight: 300) | 10 " |
| Sulfolane | 15 " |
| 1,3-dimethyl-2-imidazolidinone | 10 " |
| Water | 60 " |

A recording liquid having the above composition was prepared in the same manner as in Example 1. A felt pen was filled with this composition and writing was conducted by means of the felt pen on a medium paper and water resistance was examined. Also, with the cap being removed, the pen was left to stand for 24 hours and writing characteristic thereafter was examined.

The recording liquid of this Example was found to be excellent in both water resistance and writing characteristic after being left to stand.

EXAMPLES 4–13

According to the same procedure as in Example 1, the recording liquid having the compositions as set forth in Table 1 were prepared, and the items $(T_1)$–$(T_5)$ were examined similarly as in Example 1. In Table 1, the numerals in the patenthses indicate compositional (weight) ratios.

These recording liquids gave good results all in long term storability, recording characteristic, fixability and clearness of recorded images.

TABLE 1

| Example No. | Name of dye | Other liquid medium compositions | |
|---|---|---|---|
| 4 | C.I. Direct Blue 199 (3) | Polyethylene glycol monomethyl ether [average molecular weight: 210–240] | (15) |
| | | Diethylene glycol | (15) |
| | | 1,3-Dimethyl-2-imidazolidinone | (15) |
| | | Water | (52) |
| 5 | C.I. Direct Blue 199 (3) | Polyethylene glycol [average molecular weight: 300] | (10) |
| | | Diethylene glycol | (10) |
| | | N—methyl-2-pyrrolidone | (20) |
| | | Water | (57) |
| 6 | C.I. Direct Blue 199 (3) | Polyethylene glycol monomethyl ether [average molecular weight: 210–240] | (10) |
| | | Diethylene glycol | (15) |
| | | N—methyl-2-pyrrolidone | (10) |
| | | Water | (62) |
| 7 | C.I. Direct Blue 199 (3) | Polyethylene glycol monomethyl ether [average molecular weight 210–240] | (10) |
| | | Sulfolane | (10) |
| | | Polyethylene glycol [average molecular weight: 300] | (5) |
| | | 1,3-Dimethyl-2-imidazolidinone | (10) |
| | | Water | (62) |
| 8 | C.I. Direct Blue 199 (4) | Polyethylene glycol [average molecular weight: 300] | (15) |
| | | Diethylene glycol | (10) |
| | | N—methyl-2-pyrrolidone | (15) |
| | | Water | (56) |
| 9 | C.I. Direct Blue 199 (4) | Polyethylene glycol [average molecular weight: 300] | (15) |
| | | Sulfolane | (15) |
| | | N—methyl-2-pyrrolidone | (15) |
| | | Water | (51) |
| 10 | C.I. Direct Blue 199 (3) | Polyethylene glycol monomethyl ether [average molecular weight: 210–240] | (15) |
| | | Sulfolane | (10) |
| | | 1,3-Dimethyl-2-imidazolidinone | (15) |
| | | Triethanolamine | (1) |
| | | Water | (56) |
| 11 | C.I. Direct Blue 199 (3) | Polyethylene glycol monomethyl ether [average molecular weight: 210–240] | (15) |
| | | Diethylene glycol | (10) |
| | | N—methyl-2-pyrrolidone | (15) |
| | | Urea | (1) |
| | | Water | (56) |
| 12 | C.I. Direct Blue 199 (3) | Polyethylene glycol monomethyl ether [average molecular weight: 210–240] | (10) |
| | | Diethylene glycol | (10) |
| | | 1,3-Dimethyl-2-imidazolidinone | |
| | | Urea | (1) |
| | | Acetynol EH* | (0.1) |
| | | Water | (65.9) |
| 13 | C.I. Direct Blue 199 (4) | Polyethylene glycol monomethyl ether [average molecular weight: 210–240] | (15) |
| | | Diethylene glycol | (15) |
| | | N—methyl-2-pyrrolidone | (10) |
| | | Polyethylene glycol [average molecular weight: 300] | (5) |
| | | Triethanolamine | (1) |
| | | Acetynol EH* | (0.1) |
| | | Water | (54.9) |

*made by Kawaken Fine Chemicals Co., Ltd.

EXAMPLE 14

| | |
|---|---|
| C.I. Direct Yellow 86 | 3 parts by weight |
| Polyethylene glycol monomethyl ether (average molecular weight: 210–240) | 15 parts by weight |
| Diethylene glycol | 15 parts by weight |
| N—methyl-2-pyrrolidone | 15 parts by weight |
| Water | 52 parts by weight |

By using the above composition, a recording liquid was prepared in the same manner as in Example 1, and the following items $(T_1)$–$(T_2)$ were examined by means of the same device and according to the same methods as in Example 1. Good results were obtained in all the items.

$(T_1)$: Long term storability of recording liquid: The recording liquid was sealed in a glass vessel, and stored for 6 months at $-30°$ C. and $60°$ C., whereafter no precipitation of insolubles was recognized and there was no change in physical properties and color tone of the liquid.

$(T_2)$: Discharging stability: Continuous discharging was conducted in an atmosphere of room temperature, $5°$ C. and $40°$ C., respectively, for 24 hours. High quality recording could be performed stably from the beginning to the end under any of these conditions.

$(T_3)$: Discharging response: Intermittent discharging per every two seconds and discharging after standing for 2 months were examined. In either case, there was no clogging at the orifice tip, and recording was effected stably and uniformly.

$(T_4)$: Quality of recorded image: The image recorded was high in density and clear. The lowering in density after exposure to the light in a room for 3 months was 1% or less and blurring of the image when dipped in water for one minute was very small.

$(T_5)$: Fixability on various recording materials: On the four kinds of recording materials as employed in Example 1 were printed letters, and after 15 seconds the printed portion was rubbed with a finger and presence of slippage or blurring was judged. In any of the cases, excellent fixing characteristic was exhibited without slippage or blurring.

EXAMPLE 15

| | |
|---|---|
| Polyethylene glycol monomethyl ether (average molecular weight: 210–240) | 10 parts by weight |
| Sulfolane | 10 parts by weight |
| N—methyl-2-pyrrolidone | 20 parts by |

-continued

| | |
|---|---|
| C.I. Direct Yellow 86 | 3 parts by weight |
| Water | 57 parts by weight |

Similarly as in Example 1, a recording liquid having the above composition was prepared and the items $(T_1)$–$(T_5)$ were examined similarly as in Example 1 by means of a recording device having a multi-head of on-demand type in which recording is effected by giving heat energy to the recording liquid in the recording head to generate liquid droplets (discharging orifice diameter 35μ; resistance value of heat generating resistor 150 ohm; driving voltage 30 V; frequency 2 KHz). As the result, excellent results were obtained in all the tests examined.

EXAMPLE 16

| | |
|---|---|
| C.I. Direct Yellow 86 | 5 parts by weight |
| Polyethylene glycol (average molecular weight: 300) | 10 parts by weight |
| Sulfolane | 15 parts by weight |
| 1,3-dimethyl-2-imidazolidinone | 10 parts by weight |
| Water | 60 parts by weight |

A recording liquid having the above composition was prepared in the same manner as in Example 1. A felt pen was filled with this composition and writing was conducted by means of the felt pen on a medium paper and water resistance was examined. Also, with the cap being removed, the pen was left to stand for 24 hours and writing characteristic thereafter was examined.

The recording liquid of this Example was found to be excellent in both water resistance and writing characteristic after being left to stand.

EXAMPLES 17–26

According to the same procedure as in Example 1, the recording liquid having the compositions as set forth in Table 2 were formulated, and the items $(T_1)$–$(T_5)$ were examined similarly as in Example 1. In Table 2, the numerals in the parenthese indicate compositional (weight) ratios.

These recording liquids gave good results all in long term storability, recording characteristic, fixability and clearness of recorded images.

TABLE 2

| Example No. | Name of dye | Other liquid medium compositions | |
|---|---|---|---|
| 17 | C.I. Direct Yellow 86 (3) | Polyethylene glycol monomethyl ether [average molecular weight: 210–240] | (15) |
| | | Diethylene glycol | (15) |
| | | 1,3-Dimethyl-2-imidazolidinone | (15) |
| | | Water | |
| 18 | C.I. Direct Yellow 86 (3) | Polyethylene glycol [average molecular weight: 300] | (10) |
| | | Diethylene glycol | (10) |
| | | N—methyl-2-pyrrolidone | (20) |
| | | Water | (57) |
| | | Polyethylene glycol monomethyl ether [average molecular weight 210–240] | (10) |

TABLE 2-continued

| Example No. | Name of dye | Other liquid medium compositions | |
|---|---|---|---|
| 19 | C.I. Direct Yellow 86 (3) | Diethylene glycol | (15) |
| | | N—methyl-2-pyrrolidone | (10) |
| | | Water | (62) |
| | | Polyethylene glycol monomethyl ether [average molecular weight: 210–240] | (10) |
| 20 | C.I. Direct Yellow 86 (3) | Sulfolane | (10) |
| | | Polyethylene glycol [average molecular weight: 300] | (5) |
| | | 1,3-Dimethyl-2-imidazolidinone | (10) |
| | | Water | (62) |
| 21 | C.I. Direct Yellow 86 (4) | Polyethylene glycol [average molecular weight: 300] | (15) |
| | | Diethylene glycol | (10) |
| | | N—methyl-2-pyrrolidone | (15) |
| | | Water | (56) |
| | | Polyethylene glycol [average molecular weight: 300] | (15) |
| 22 | C.I. Direct Yellow 86 (4) | Sulfolane | (15) |
| | | N—methyl-2-pyrrolidone | (15) |
| | | Water | (51) |
| | | Polyethylene glycol monomethyl ether [average molecular weight: 210–240] | (15) |
| 23 | C.I. Direct Yellow 86 (3) | Sulfolane | (10) |
| | | 1,3-Dimethyl-2-imidazolidinone | (15) |
| | | Triethanolamine | (1) |
| | | Water | (56) |
| | | Polyethylene glycol monomethyl ether [average molecular weight: 210–240] | (15) |
| 24 | C.I. Direct Yellow 86 (3) | Diethylene glycol | (10) |
| | | N—methyl-2-pyrrolidone | (15) |
| | | Urea | (1) |
| | | Water | (56) |
| | | Polyethylene glycol monomethyl ether [average molecular weight: 210–240] | (10) |
| 25 | C.I. Direct Yellow 86 (3) | Diethylene glycol | (10) |
| | | 1,3-Dimethyl-2-imidazolidinone | (10) |
| | | Urea | (1) |
| | | Acetynol EH | (0.1) |
| | | Water | (65.9) |
| | | Polyethylene glycol monomethyl ether [average molecular weight: 210–240] | (10) |
| 26 | C.I. Direct Yellow 86 (4) | Diethylene glycol | (15) |
| | | N—methyl-2-pyrrolidone | (10) |
| | | Polyethylene glycol [average molecular weight: 300] | (5) |
| | | Triethanolamine | (1) |
| | | Acetynol EH | (0.1) |
| | | Water | (54.9) |

EXAMPLE 27

| | |
|---|---|
| C.I. Food Black 2 | 3 parts by weight |
| Polyethylene glycol monomethyl ether (average molecular weight: 210–240) | 15 parts by weight |
| Diethylene glycol | 15 parts by weight |
| N—methyl-2-pyrrolidone | 15 parts by weight |
| Water | 52 parts by weight |

By using the above composition, a recording liquid was prepared in the same manner as in Example 1, and the following items $(T_1)$–$(T_2)$ were examined by means of the same device and according to the same methods as in Example 1. As the result, good results were obtained in all the items.

($T_1$): Long term storability of recording liquid: The recording liquid was sealed in a glass vessel, and stored for 6 months at $-30°$ C. and $60°$ C., whereafter no precipitation of insolubles was recognized and there was no change in physical properties and color tone of the liquid.

($T_2$): Discharging stability: Continuous discharging was conducted in an atmosphere of room temperature, $5°$ C. and $40°$ C., respectively, for 24 hours. High quality recording could be performed stably from the beginning to the end under any of these conditions.

($T_3$): Discharging response: Intermittent discharging per every two seconds and discharging after standing for 2 months were examined. In either case, there was no clogging at the orifice tip, and recording was effected stably and uniformly.

($T_4$): Image quality of recorded image: The image recorded was high in density and clear. The lowering in density after exposure to the light in a room for 3 months was 1% or less and blurring of the image when dipped in water for one minute was very small.

($T_5$): Fixability on various recording materials: On the four kinds of recording materials as employed in Example 1 were printed letters, and after 15 seconds the printed portion was rubbed with a finger and presence of slippage or blurring was judged. In any of the cases, excellent fixing characteristic was exhibited without slippage or blurring.

EXAMPLE 28

| | |
|---|---|
| Polyethylene glycol monomethyl ether (average molecular weight: 210–240) | 10 parts by weight |
| Sulfolane | 10 parts by weight |
| N—methyl-2-pyrrolidone | 20 parts by weight |
| C.I. Food Black 2 | 3 parts by weight |
| Water | 57 parts by weight |

Similarly as in Example 1, a recording liquid having the above composition was prepared and the items ($T_1$)–($T_2$) were examined similarly as in Example 1 by means of a recording device having a multi-head of on-demand type in which recording is effected by giving heat energy to the recording liquid in the recording head to generate liquid droplets (discharging orifice diameter $35\mu$; resistance value of heat generating resistor 150 ohm; driving voltage 30 V; frequency 2 KHz). Excellent results were obtained in all the tests examined.

EXAMPLE 29

| | |
|---|---|
| C.I. Food Black 2 | 5 parts by weight |
| Polyethylene glycol (average molecular weight: 300) | 10 parts by weight |
| Sulfolane | 15 parts by weight |
| 1,3-dimethyl-2-imidazolidinone | 10 parts by weight |
| Water | 60 parts by weight |

A recording liquid having the above composition was prepared in the same manner as in Example 1. A felt pen was filled with this composition and writing was conducted by means of the felt pen on a medium paper and water resistance was examined. Also, with the cap being removed, the pen was left to stand for 24 hours and writing characteristic thereafter was examined.

The recording liquid of this Example was found to be excellent in both water resistance and writing characteristic after being left to stand.

EXAMPLES 30–39

According to the same procedure as in Example 1, the recording liquid having the compositions as set forth in Table 3 were prepared, and the items ($T_1$)–($T_5$) were examined similarly as in Example 1. In Table 3, the numerals in the parenthese indicate compositional (weight) ratios.

These recording liquids gave good results all in long term storability, recording characteristic, fixability and clearness of recorded images.

TABLE 3

| Example No. | Name of dye | Other liquid medium compositions | |
|---|---|---|---|
| 30 | C.I. Food Black 2 (3) | Polyethylene glycol monomethyl ether [average molecular weight: 210-240] | (15) |
| | | Diethylene glycol | (15) |
| | | 1,3-Dimethyl-2-imidazolidinone | (15) |
| | | Water | (52) |
| 31 | C.I. Food Black 2 (3) | Polyethylene glycol [average molecular weight: 300] | (10) |
| | | Diethylene glycol | (10) |
| | | N—methyl-2-pyrrolidone | (20) |
| | | Water | (57) |
| 32 | C.I. Food Black 2 (3) | Polyethylene glycol monomethyl ether [average molecular weight: 210-240] | (10) |
| | | Diethylene glycol | (15) |
| | | N—methyl-2-pyrrolidone | (10) |
| | | Water | (62) |
| 33 | C.I. Food Black 2 (3) | Polyethylene glycol monomethyl ether [average molecular weight: 210-240] | (10) |
| | | Sulfolane | (10) |
| | | Polyethylene glycol [average molecular weight: 300] | (5) |
| | | 1,3-Dimethyl-2-imidazolidinone | (10) |
| | | Water | (62) |
| 34 | C.I. Food Black 2 (4) | Polyethylene glycol [average molecular weight: 300] | (15) |
| | | Diethylene glycol | (10) |
| | | N—methyl-2-pyrrolidone | (15) |
| | | Water | (56) |
| 35 | C.I. Food Black 2 (4) | Polyethylene glycol [average molecular weight: 300] | (15) |
| | | Sulfolane | (15) |
| | | N—methyl-2-pyrrolidone | (15) |
| | | Water | (51) |
| 36 | C.I. Food Black 2 (3) | Polyethylene glycol monomethyl ether [average molecular weight: 210-240] | (15) |
| | | Sulfolane | (10) |
| | | 1,3-Dimethyl-2-imidazolidinone | (15) |
| | | Triethanolamine | (1) |
| | | Water | (56) |
| 37 | C.I. Food Black 2 (3) | Polyethylene glycol monomethyl ether [average molecular weight: 210-240] | (15) |
| | | Diethylene glycol | (10) |
| | | N—methyl-2-pyrrolidone | (15) |
| | | Urea | (1) |
| | | Water | (56) |
| 38 | C.I. Food Black 2 (3) | Polyethylene glycol monomethyl ether [average molecular weight: 210-240] | (10) |
| | | Diethylene glycol | (10) |
| | | 1,3-Dimethyl-2-imidazolidinone | (10) |
| | | Urea | (1) |
| | | Acetynol EH | (0.1) |
| | | Water | (65.9) |

TABLE 3-continued

| Example No. | Name of dye | Other liquid medium compositions | |
|---|---|---|---|
| 39 | C.I. Food Black 2 (4) | Polyethylene glycol monomethyl ether [average molecular weight: 210–240] | (10) |
| | | Diethylene glycol | (15) |
| | | N—methyl-2-pyrrolidone | (10) |
| | | Polyethylene glycol [average molecular weight: 200] | (5) |
| | | Triethanolamine | (1) |
| | | Acetynol EH | (0.1) |
| | | Water | (54.9) |

As described above, the recording liquid according to the present invention has the following advantages:

(1) The recording liquid has good stability during storage over a long term and will cause difficultly clogging of the discharging outlet;

(2) Allowance in stable discharging is broad against fluctuations in temperature and driving conditions;

(3) Fixing onto a recording sheet can rapidly be effected and the image obtained is clear;

(4) Recorded print has good water resistance and light resistance; and (5) Safety of the recording liquid is high without corrosion of the surrounding materials (vessel sealing materials, etc.).

What we claim is:

1. A recording liquid comprising C.I. Direct Blue 199 as a recording agent and a liquid medium for dissolving or dispersing said recording agent therein, said liquid medium comprising at least:
   (a) either one or both of polyethylene glycol and polyethylene glycol monomethyl ether,
   (b) either one or both of diethylene glycol and sulfolane,
   (c) either one or both of N-methyl-2-pyrrolidone and 1,3-dimethyl-2-imidazolidinone, and
   (d) water.

2. A recording liquid according to claim 1, wherein C.I. Direct Blue 199 is contained in a quantity of from 0.1 to 20% by weight of the recording liquid.

3. A recording liquid according to claim 2, wherein C.I. Direct Blue 199 is contained in a quantity of from 0.5 to 15% by weight of the recording liquid.

4. A recording liquid according to claim 3, wherein C.I. Direct Blue 199 is contained in a quantity of from 1 to 10% by weight of the recording liquid.

5. A recording liquid according to claim 1, wherein said liquid medium contains one or both of polyethylene glycol and polyethylene glycol monomethyl ether in a quantity of from 1 to 30% based on the weight of the recording liquid.

6. A recording liquid according to claim 1, wherein said liquid medium contains one or both of diethylene glycol and sulfolane in a quantity of from 1 to 40% based on the weight of the recording liquid.

7. A recording liquid according to claim 1, wherein said liquid medium contains one or both of N-methyl-2-pyrrolidone and 1,3-dimethyl-2-imidazolidinone in a quantity of from 1 to 40% based on the weight of the recording liquid.

8. A recording liquid according to claim 1, wherein said liquid medium contains water in a quantity of from 10 to 90% based on the weight of the recording liquid.

9. A recording liquid comprising C.I. Direct Yellow 86 as a recording agent and a liquid medium for dissolving or dispersing said recording agent therein, said liquid medium comprising at least:
   (a) either one or both of polyethylene glycol and polyethylene glycol monomethyl ether,
   (b) either one or both of diethylene glycol and sulforane,
   (c) either one or both of N-methyl-2-pyrrolidone and 1,3-dimethyl-2-imidazolidinone, and
   (d) water.

10. A recording liquid according to claim 9, wherein C.I. Direct Yellow 86 is contained in a quantity of from 0.1 to 20% by weight of the recording liquid.

11. A recording liquid according to claim 10, wherein C.I. Direct Yellow 86 is contained in a quantity of from 0.5 to 15% by weight of the recording liquid.

12. A recording liquid according to claim 11, wherein C.I. Direct Yellow 86 is contained in a quantity of from 1 to 10% by weight of the recording liquid.

13. A recording liquid according to claim 9, wherein said liquid medium contains one or both of polyethylene glycol and polyethylene glycol monomethyl ether in a quantity of from 1 to 30% based on the weight of the recording liquid.

14. A recording liquid according to claim 9, wherein said liquid medium contains one or both of diethylene glycol and sulfolane in a quantity of from 1 to 40% based on the weight of the recording liquid.

15. A recording liquid according to claim 9, wherein said liquid medium contains one or both of N-methyl-2-pyrrolidone and 1,3-dimethyl-2-imidazolidinone in a quantity of from 1 to 40% based on the weight of the recording liquid.

16. A recording liquid according to claim 9, wherein said liquid medium contains water in a quantity of from 10 to 90% based on the weight of the recording liquid.

17. A recording liquid comprising C.I. Food Black 2 as a recording agent and a liquid medium for dissolving or dispersing said recording agent therein, said liquid medium comprising at least:
   (a) either one or both of polyethylene glycol and polyethylene glycol monomethyl ether,
   (b) either one or both of diethylene glycol and sulforane,
   (c) either one or both of N-methyl-2-pyrrolidone and 1,3-dimethyl-2-imidazolidinone, and
   (d) water.

18. A recording liquid according to claim 17, wherein C.I. Food Black 2 is contained in a quantity of from 0.1 to 20% by weight of the recording liquid.

19. A recording liquid according to claim 18, wherein C.I. Food Black 2 is contained in a quantity of from 0.5 to 15% by weight of the recording liquid.

20. A recording liquid according to claim 19, wherein C.I. Food Black 2 is contained in a quantity of from 1 to 10% by weight of the recording liquid.

21. A recording liquid according to claim 17, wherein said liquid medium contains one or both of polyethylene glycol and polyethylene glycol monomethyl ether in a quantity of from 1 to 30% based on the weight of the recording liquid.

22. A recording liquid according to claim 17, wherein said liquid medium contains one or both of diethylene glycol and sulfolane in a quantity of from 1 to 40% based on the weight of the recording liquid.

23. A recording liquid according to claim 17, wherein said liquid medium contains one or both of N-methyl-2-pyrrolidone and 1,3-dimethyl-2-imidazolidinone in a quantity of from 1 to 40% based on the weight of the recording liquid.

24. A recording liquid according to claim 17, wherein said liquid medium contains water in a quantity of from 10 to 90% based on the weight of the recording liquid.

25. A recording liquid comprising (1) a recording agent selected from the group consisting of C.I. Direct Blue 199, C.I. Direct Yellow 86, C.I. Food Black 2 and mixtures thereof and (2) a liquid medium for dissolving or dispersing said recording agent therein, said liquid medium comprising at least:
- (a) either one or both of polyethylene glycol and polyethylene glycol monomethyl ether,
- (b) either one or both of diethylene glycol and sulfolane,
- (c) either one or both of n-methyl-2-pyrrolidone and 1,3-dimethyl-2-imidazolidinone, and
- (d) water.

* * * * *

UNITED STATES PATENT AND TRADEMARK OFFICE
CERTIFICATE OF CORRECTION

PATENT NO. : 4,585,484

DATED : April 29, 1986

INVENTOR(S) : MASAHIRO HARUTA, ET AL.

Page 1 of 2

It is certified that error appears in the above-identified patent and that said Letters Patent is hereby corrected as shown below:

COLUMN 5

Line 53, "$(T_1)-(T_2)$" should read --$(T_1)-(T_5)$--.

COLUMN 7

Line 60, "water (56) should be flush right.
Line 64, "(10)" should read --(10)--.
                                                      (10)
          ( 1)                          ( 1)

COLUMN 8

Line 29, "$(T_1)-(T_2)$" should read --$(T_1)-(T_5)$--.

COLUMN 9

Line 62, "(15)" should read --(15)--.
                                                (52)
          (10)                          (10)

COLUMN 10

Line 65, "$(T_1)-(T_2)$" should read --$(T_2)-(T_5)$--.

COLUMN 11

Line 43, "$(T_1)-(T_2)$" should read --$(T_1)-(T_5)$--.

UNITED STATES PATENT AND TRADEMARK OFFICE
CERTIFICATE OF CORRECTION

PATENT NO. : 4,585,484

DATED : April 29, 1986

INVENTOR(S) : MASAHIRO HARUTA, ET AL.

It is certified that error appears in the above-identified patent and that said Letters Patent is hereby corrected as shown below:

COLUMN 14

Lines 5-6, "sulfo-/rane," should read --sulfolane,--.
Lines 42-3, "sulfo-/rane," should read --sulfolane,--.

Signed and Sealed this

Twenty-fourth Day of March, 1987

Attest:

DONALD J. QUIGG

Attesting Officer

Commissioner of Patents and Trademarks